Aug. 1, 1939.       G. E. MIRFIELD           2,167,766
       APPARATUS FOR ROTATING AND SHAPING ELECTRODES
                OF ELECTRIC WELDING MACHINES
                   Filed Jan. 15, 1938        2 Sheets-Sheet 1

INVENTOR
George E. Mirfield.

Aug. 1, 1939.     G. E. MIRFIELD     2,167,766
APPARATUS FOR ROTATING AND SHAPING ELECTRODES
OF ELECTRIC WELDING MACHINES
Filed Jan. 15, 1938     2 Sheets-Sheet 2
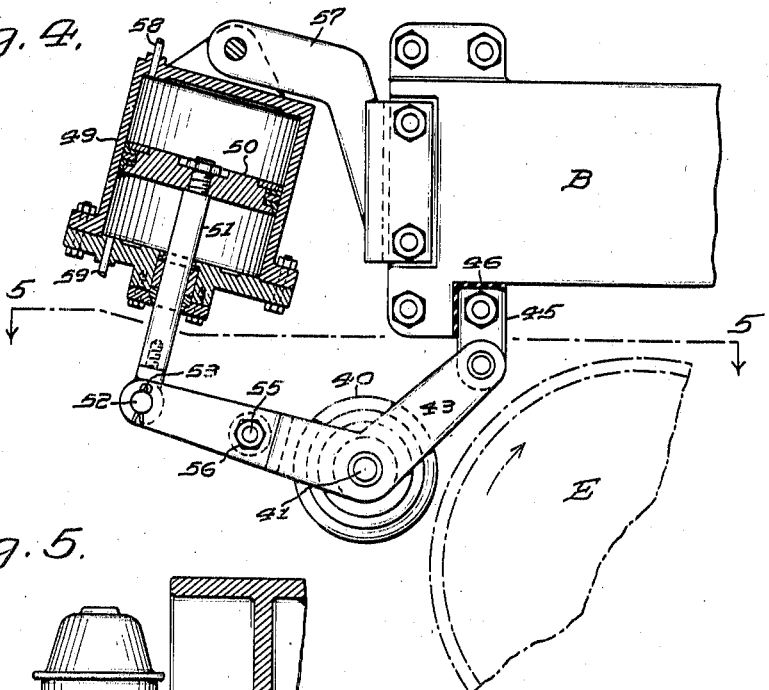
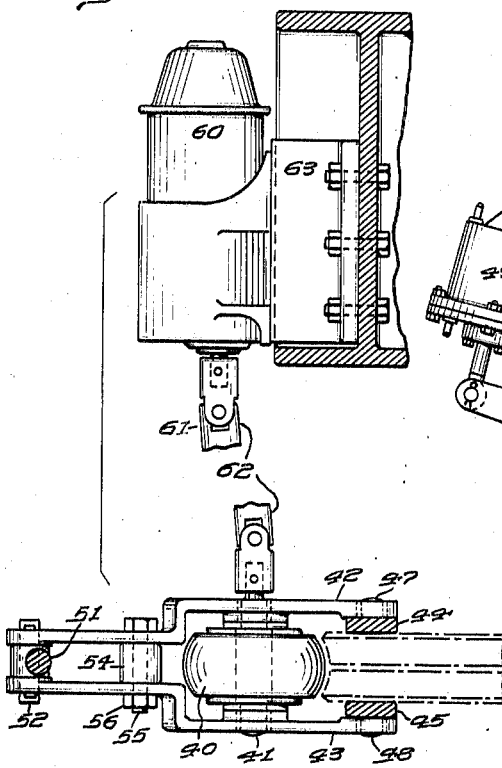
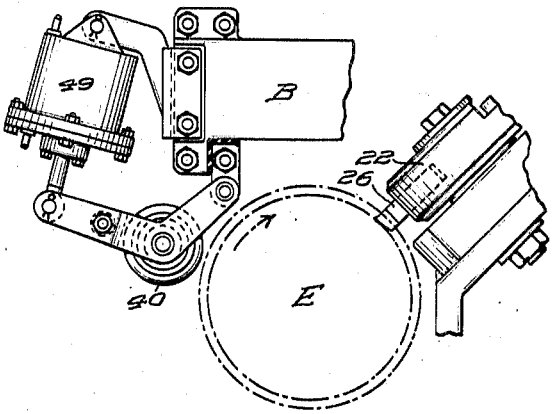
WITNESS
F. J. Hartman.
INVENTOR
George E. Mirfield.
BY
ATTORNEY Patented Aug. 1, 1939

2,167,766

UNITED STATES PATENT OFFICE 2,167,766

APPARATUS FOR ROTATING AND SHAPING ELECTRODES OF ELECTRIC WELDING MACHINES

George E. Mirfield, Youngstown, Ohio, assignor to The Youngstown Sheet and Tube Company, Youngstown, Ohio, a corporation of Ohio Application January 15, 1938, Serial No. 185,082

10 Claims. (Cl. 82—4)

This invention relates to electric welding machines particularly those comprising a pair of coaxial electrodes which conduct welding current through the work to be welded as they are rotated by the latter and is directed especially to mechanism adapted for association and combination with such machines to shape or renew their electrode work-contacting surfaces when these are not of the proper contour or are so rough and uneven as to impair their efficiency.

In welding machines of this type for welding pipes and other tubular articles the peripheral surfaces of the electrodes which engage the blanks are shaped to generally conform to the work and when they do not so conform, or have material surface irregularities such as are produced by scoring, burning or digging in of the blanks when their front ends are moved into contact with the electrodes, they make imperfect electrical contact with the work and produce an unsatisfactory welded seam, while the heavy welding current may cause further burning or pitting of the electrodes at the points where imperfect contact is made. It is consequently important for efficient and economical operation that the electrodes be maintained as smooth as possible and of the proper conformation to afford a good electrical contact with the work, but the shutting down of the welding machine for the considerable period heretofore necessary for reconditioning or reshaping the electrodes to restore their surfaces to this condition has limited the amount of work which could be done by a given machine in a unit of time and made the cost per unit of work unduly high.

In accordance with my invention, however, when the electrodes become roughened, through burning, pitting or digging in of the ends of the blanks or otherwise or are of improper contour, it is possible to restore their surfaces to initial smoothness and/or to a suitable or desired contour so as to enable them to thereafter operate satisfactorily without keeping the machine out of operation for an extended period.

It is therefore a principal object of the invention to provide mechanism for moving a dressing or cutting tool relatively to the electrodes in such manner as to dress off or shape the contour of their contact making surfaces and means for driving the electrodes while the tool is operating thereon whereby the renewal and/or reshaping of the said surfaces may be conveniently effected in a minimum of time without requiring dismantling of the machine or removal of the electrodes therefrom.

Another object is to provide driving and dressing or cutting means adapted for association and combination with coaxial electrodes of a pipe welding machine for concurrently operating upon such electrodes to dress or to effect desired changes in the contours of their peripheral work-contacting surfaces and which may be brought into play to operate upon these surfaces without necessarily interrupting the flow of the welding current thereto.

Still another object of the invention is to provide means of the character aforesaid by the use of which the work-contacting surfaces of a pair of juxtaposed circular electrodes may be shaped to conform to a continuous arc struck from a single center or may be respectively shaped to conform to arcs struck from different centers; which are relatively simple in design, construction and arrangement; may be readily attached to existing welding machines or incorporated in future machines during their construction at relatively small expense; may be conveniently brought into play for the performance of their intended function when required, and do not in any way interfere with the normal operation of the welding machine.

Other objects, purposes and advantages of the invention will hereinafter more fully appear or will be understood from the following description of apparatus embodying it as illustrated in the accompanying drawings in operative combination and association with a typical pipe welding machine and in which Fig. 1 is a fragmentary angular plan detail of the electrode trimming tool and certain associated parts of said apparatus.

Fig. 2 is a side elevation of the mechanism shown in Fig. 1.

Fig. 3 is a fragmentary elevation thereof in a plane normal to the radius of the electrode corresponding generally to the axis of the tool.

Fig. 4 on a smaller scale is a detail in side elevation of electrode driving mechanism included in the apparatus with certain parts in vertical section.

Fig. 5 is a fragmentary section thereof on the line 5—5 in Fig. 4, and

Fig. 6 is a fragmentary composite side elevation of the entire apparatus showing the relation to each other of the mechanisms shown in the preceding figures.

In the several figures like characters are used to designate the same parts.

A welding machine for use in association with which the apparatus illustrated is particularly adapted may comprise a pair of electrodes E, E' rotatable on a common axis in suitable supports such as a cross beam B having electrode supporting brackets (not shown) depending therefrom. The electrodes have curved work-contacting surfaces e, e', a radial section of which more or less generally conforms to the curvature of the pipe to be welded; thus such a section of each electrode may closely approximate the blank curvature without the surfaces of both electrodes being concentric or they may be concentrically curved on the same center but preferably on a slightly larger radius than that of the tubular blanks. The outer rims of the electrodes adjacent the surfaces e, e' are chamfered off in receding bevels r, r' in the usual way.

As the apparatus of my invention while particularly adapted for association and combination with a welding machine of the character just described is adapted as well for use with machines of other specific types, and as the structure of the welding machine itself forms no part of the present invention, further specific reference thereto would be superfluous.

In attaining the objects of the invention in a welding machine of the said character, however, I position on one side of the electrodes, preferably that side on which the work enters the machine and at a point adjacent the periphery of the electrodes about 45° above the horizontal plane of their axis, certain mechanism, the principal specific function of which is the actual dressing or shaping of the electrode surfaces. This mechanism is supported from a bracket 1 adapted to be secured to one of the electrode brackets or other suitable support by bolts or cap screws 2 extending through its face plate 3. The tool supporting plate or portion 4 of this bracket 1 extends substantially radially with respect to the electrodes and into their vertical plane and forms a seat for a base 5 from the lower face of which a threaded stud 6 projects through a central aperture in the plate 4 to enable the base to be firmly secured to the bracket by means of a nut 7 seating against a washer 8. The base 5 has undercut ways 9 in its upper surface for the reception of the complementary dove-tails of a slide 10 which is thus movable along these ways in a path coincident with a radial plane of the electrodes. This movement of the slide in the base can be effected and accurately controlled by operation of a threaded screw 11 extending through a correspondingly threaded boss 12 on the base and through a plate 14 secured as by screws 15 to the outer end of the slide, the screw carrying operatively fixed collars 16 and 17 on opposite sides of the plate, so that as the screw is turned in either direction the slide will be moved correspondingly. The head of the screw is squared to receive a crank handle, wrench or the like for turning the screw and the slide can thus readily be moved toward or away from the electrodes as desired.

Extending from the upper face of the slide is a cylindrical stud 18 and adjacent the stud is a pin 19, preferably inserted in the slide, extending upwardly a short distance in parallelism with the stud for reception in one of a series of holes 20 in the lower end of an eccentric bushing 21 fitted about the stud.

A tool holder 22 bored to snugly fit over the eccentric bushing 21 is seated on the base and restrained from sliding upwardly by a washer 23 which overlies the bushing and tool holder and a cap screw 24 extending through the washer and into the stud 18. One end of the tool holder, that adjacent the electrodes, has in it a cavity 25 for the reception of a tool 26 which is held therein by a set screw 27; the tool thus moves with the tool holder and when the latter is swung about the bushing 21 the cutting edge of the tool is also swung in an arcuate path which may be made to correspond to the electrode surface. This movement of the tool is effected, in the mechanism shown in the drawings, through a worm gear segment 28, carried by the rear end of the tool holder and secured thereto by screws 29, which is driven by a worm 30 rotatably supported on a shaft 31 journaled in lugs 32 on the slide so that when the worm is rotated the tool holder is swung arcuately about the bushing 21. The shaft 31 may be driven in any suitable manner, preferably through a flexible shaft comprising universal joints 33, fragmentarily indicated in Fig. 1, connected with a motor 34 supported from any convenient part of the welding machine frame (not shown).

Mention has been made of the pin 19 in the tool holder slide and the holes 20 in the eccentric bushing as shown in Figs. 1 and 2. These are used to determine the position of the bushing relatively to the respective electrodes during the dressing operation since, due to the eccentricity of the outer surface of the bushing with respect to its bore, the axis of the former may be shifted by moving the bushing about the stud 18. Thus when the cap screw 24 is backed off and the bushing raised it may be turned about the stud and then lowered so as to enter the pin 19 in one of the holes 20; the bushing is then held by the pin against rotation about the stud 18 with the axis of its outer surface, about which the tool holder turns, spaced from the axis of the stud. In Fig. 1 the bushing is shown with the pin 19 entered in hole 20a lying in the plane of the axes of its inner and outer surfaces so that the axis of the tool holder in its movement about the bushing lies in the vertical plane midway between the electrodes and when the tool holder and tool are moved about this axis the tool therefore forms concentric surfaces on the electrodes but other adjustments of the bushing which will hereinafter be more fully explained permit surfaces corresponding to arcs struck from different centers to be formed on the electrodes.

The electrodes of most pipe welding machines are not positively driven but are merely rotated by frictional engagement with the work as it passes between them while being welded and my invention therefore includes means for driving the electrodes when their surfaces are being operated upon by the dressing mechanism just described. These driving means, as best shown in Figs. 4 and 5, comprise a rubber tired roller 40, the external contour of which generally conforms to the curvature of a radial section of both electrodes; this roller is supported on and secured to an axle 41 journaled in arms 42, 43 carried by hangers 44, 45 which are bolted to the top cross beam B of the welding machine and insulation 46 is interposed between the hangers and the beam to prevent short-circuiting of the opposite polarities in the beam on either side of the central plane of the electrodes. The arms are supported from the hangers on pivots 47, 48, which may be integral with the latter, and as the arms are swung about these pivots the roller 40 is moved toward or away from the electrodes; rotation of the roller is thus effective to drive the electrodes when the arms 42, 43 are swung to bring it firmly into contact with them.

This swinging of the arms is effected by means of a fluid cylinder 49, the piston 50 in which operates through a connecting rod 51 pivotally connected to the arms by a pin 52 extending through them and through the connecting rod and maintained in position by cotter keys 53. The arms are rigidly held together against a spacer bushing 54 by bolt 55 and nut 56 between the roller 40 and the connecting rod, and the cylinder 49 is journaled in a bracket 57 bolted to but insulated from the beam B so that by admission of fluid pressure to the cylinder through one or the other of the pipes 58, 59 the piston may be moved to swing the arms on their pivots and move the roller 40 into or out of driving engagement with the electrodes.

The roller 40 is operated to drive the electrodes when in such engagement with them by a motor 60 which is interconnected with the roller axle or shaft 41 through a flexible drive shaft 61 comprising universal joints 62, the flexibility of the shaft permitting the roller to be moved away from or toward the electrodes without disconnecting the shaft, although the motor is rigidly fixed to the welding machine by a supporting bracket 63 bolted to some convenient portion of the welding machine such as one of the beam supporting members.

*Operation*

The dressing and driving mechanisms heretofore described are preferably positioned adjacent the electrodes on opposite sides of their vertical axial plane in which position they are respectively readily accessible from opposite sides of the machine, and when the electrodes are being dressed or reshaped both mechanisms are employed simultaneously. During either operation the electrodes are driven in the direction of the arrow in Fig. 6 by the roller 40 which through operation of the fluid cylinder 49, is brought into and held in tight frictional engagement with them so as to drive them when the roller is driven by the motor 60 and the tool 26 is moved across their peripheral faces on an arcuate path by operation of the motor 34 driving the worm 30 to thereby swing the tool holder about the bushing 21, the screw 11 being operated to bring the cutting edge of the tool 26 into the proper radial relation with the electrode surfaces.

When the bushing 21 is in the position on the slide indicated in Figs. 1 and 2, the operations just described result in the tool being moved across the faces of both electrodes in an arc the center of which lies in the vertical plane midway between them and their faces are consequently made concentric and symmetrical. If it is desired to shape them on non-concentric arcs, however, the slide is retracted, the cap screw 24 loosened so as to permit the slide to be raised or taken off, and the bushing 21 then released from the pin 19 and rotated through a small arc until a suitable one of the series of holes 20 is in position to receive the pin. The parts are then re-assembled and one of the electrodes dressed with consequent production of a surface corresponding to an arc of a circle on a center determined by the eccentricity of the bushing; the latter is then again adjusted, preferably to the corresponding hole in the series 20 on the opposite side of the hole 20a positioned at the center of the series, and the other electrode dressed in a similar manner after re-assembly of the parts.

The apparatus is also adapted for trimming off the rims r, r' of the electrodes and for this operation the nut 7 is loosened to permit the base 5 to be swung to a position such that the tool holder will be carried angularly inwardly by operation of the screw 11, so as to properly trim one of the said rims, and the holder is then similarly but oppositely adjusted so as to trim the other rim, the motor 34 of course not being employed. This motor, however, remains connected with the worm 30 through the flexible shaft which is desirably so constructed as to allow this swinging of the base to be readily effected.

Of course, as is usual in all generally comparable cutting operations, the material worked upon, in this case the electrodes, is rotated continuously during the operation of the cutting tool and it is evident that substantially any specific concave form may be respectively imparted to the work-contacting faces of the electrodes so as to make either symmetrical or non-symmetrical as desired and that their outer rims may be also readily chamfered off on flat bevels by operation of my apparatus without removing the electrodes from the machine or causing material interruption of their normal work, while due to the insulation of the parts it is even unnecessary to shut off the welding current. Naturally after the dressing or trimming has been completed and preparatory to resumption of welding, the tool holder slide is retracted from the immediate vicinity of the electrodes by operation of the screw 11 and the roller 40 also retracted by operation of the fluid cylinder to raise the roller arms.

While I have herein described the invention with considerable particularity as embodied in certain apparatus of specific form which I consider well adapted for attaining the purposes and objects thereof, it will be understood that I do not intend to limit or confine myself thereto or thereby in any way as changes and modifications in the form, construction and arrangement of the individual units and their several parts as well as in their relation to each other and to the elements operated upon will readily occur to those skilled in the art and may be made if desired without departing from the spirit and scope of the invention as defined in the appended claims.

Having thus described my invention, I claim and desire to protect by Letters Patent of the United States:

1. In means for shaping a rotatable welding electrode, a tool holder disposed adjacent the peripheral surface of the electrode adapted to support a tool for operation thereon, means for rotatably supporting the tool holder comprising a slide adapted for rectilinear movement toward and away from the electrode, a stud projecting from the slide, an eccentric bushing surrounding the stud and extending into the tool holder, means for holding the bushing in predetermined rotatably adjusted position on the stud and means for swinging the tool holder about the bushing to thereby move the tool in an arcuate path relatively to the electrode.

2. In means for shaping a rotatable welding electrode, a tool holder disposed adjacent the peripheral surface of the electrode adapted to support a tool for operation thereon, means for rotatably supporting the tool holder comprising a slide adapted for rectilinear movement toward and away from the electrode, a stud projecting from the slide, an eccentric bushing surrounding the stud and extending into the tool holder, means for holding the bushing in predetermined rotatably adjusted position on the stud, a gear segment carried by the tool holder, and a worm meshing with said segment operative when rotated in either direction to turn the segment and the tool holder about the bushing and thereby swing the tool in an arcuate path relative to the electrode, and means for driving the worm.

3. In means for shaping a rotatable welding electrode, a tool holder disposed adjacent the peripheral surface thereof adapted to support a tool for operation thereon, means for supporting the tool holder comprising a slide interconnected therewith and a base providing ways receiving the slide for rectilinear movement relatively to the electrode, a base-supporting bracket, a stud extending from the base through the bracket and means cooperative with the stud for clamping the base to the bracket within predetermined limits of angularity relatively to the electrode, and means interposed between the slide and the base for moving the slide longitudinally of said ways and holding it in longitudinally adjusted position therein.

4. In means for shaping a rotatable welding electrode, a tool holder disposed adjacent its peripheral surface adapted to support a tool for operation thereon, means for supporting the tool holder comprising a bushing having eccentric inner and outer cylindrical surfaces rotatably fitted within a bore in the tool holder, a slide adapted for movement in a rectilinear path comprising a stud rotatably fitted within the bore in the bushing and supporting it for rotation with respect to the slide, and means carried by the slide cooperative with the bushing for holding the latter in predetermined rotatively adjusted position.

5. In means for shaping a rotatable welding electrode, a tool holder disposed adjacent its peripheral surface adapted to support a tool for operation thereon, means for supporting the tool holder comprising a base having ways in its upper face, a slide cooperative with said ways, means for moving the slide in the ways and retaining it in adjusted position therein, a stud projecting from the upper face of the slide, a pin similarly projecting therefrom adjacent the stud, a bushing rotatably fitting in a bore in the tool holder and rotatably fitted on the stud having its outer surface in eccentric relation to its inner surface and a series of holes in its lower end respectively adapted to receive the pin when the bushing is seated on the stud, and means for removably holding the bushing and tool holder in assembled relation on the stud.

6. In means for shaping a rotatable welding electrode, a tool holder disposed adjacent its peripheral surface adapted to support a tool for operation thereon, means for rotatably supporting the tool holder comprising a cylindrical stud, an element carrying said stud, a bushing rotatably fitted on the stud and in turn rotatably fitting in a bore in the tool holder, the outer surface of the bushing being eccentric with respect to its inner surface, and means for holding the bushing in different positions of rotative adjustment about the stud whereby the axis of rotation of the tool holder with respect to the electrode may be varied by changing the adjusted position of the bushing.

7. Means for dressing the peripheral surfaces of circular juxtaposed welding electrodes comprising driving means including a driving roller and means for bringing it into driving engagement with said surfaces and withdrawing it therefrom, a tool holder adapted to support a tool for operation on said surfaces, and means for adjustably supporting the tool holder within predetermined limits of angular adjustment with respect to said axis and for movement toward and away from the electrodes.

8. Means for dressing the peripheral surface of a rotatable welding electrode comprising a driving roller adapted for engagement therewith, means for moving the roller into driving contact with said surface, and means for rotating the roller, all disposed on one side of the axis of rotation of the electrode, a tool holder adapted to carry a tool for operation on said surface, and means supporting said holder on the opposite side of said axis comprising a bracket and supporting means therefor, a base rotatably mounted on the bracket, means for holding the base in rotatably adjusted position on the bracket, a slide carried by the base and movable toward and away from the electrode, and means carried by the slide cooperative with the tool holder to maintain the latter thereon in different positions of angular adjustment with respect to the electrode.

9. Rotatable welding electrode dressing mechanism comprising a tool adapted to operate on the peripheral surface of the electrode, means for adjustably supporting the tool for such operation, and means for driving the electrode while the tool is operating thereon comprising a friction roller, means for rotating the roller, and means for moving it into and out of driving engagement with said peripheral surface.

10. Rotatable welding electrode dressing mechanism comprising a tool adapted to operate on the peripheral surface of the electrode, means for adjustably supporting the tool for such operation, and means for driving the electrode while the tool is operating thereon comprising a pivoted arm disposed adjacent the electrode, a friction roller carried by the arm for movement therewith toward and away from the electrode, means for moving the arm including a fluid actuated piston and connecting means interposed between the piston and the arm, and means for rotating the roller to thereby drive the electrode when brought into engagement therewith by actuation of the piston.

GEORGE E. MIRFIELD.